US009554337B2

(12) United States Patent
Jänis et al.

(10) Patent No.: US 9,554,337 B2
(45) Date of Patent: Jan. 24, 2017

(54) INTERFERENCE-AWARE SCHEDULING WITH BROADCAST/MULTICAST SIGNALING

(75) Inventors: Pekka Jänis, Espoo (FI); Markus Nentwig, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 36 days.

(21) Appl. No.: 13/824,724

(22) PCT Filed: Oct. 20, 2010

(86) PCT No.: PCT/IB2010/002687
§ 371 (c)(1),
(2), (4) Date: Mar. 18, 2013

(87) PCT Pub. No.: WO2012/052792
PCT Pub. Date: Apr. 26, 2012

(65) Prior Publication Data
US 2013/0182600 A1    Jul. 18, 2013

(51) Int. Cl.
*H04W 52/24*    (2009.01)
*H04W 72/08*    (2009.01)
*H04W 72/04*    (2009.01)

(52) U.S. Cl.
CPC ......... *H04W 52/243* (2013.01); *H04W 72/082* (2013.01); *H04W 72/0406* (2013.01)

(58) Field of Classification Search
USPC ...... 370/252, 253, 318, 329; 455/12.4, 63.1, 455/127.1, 127.5, 501, 510, 522
See application file for complete search history.

(56) References Cited

U.S. PATENT DOCUMENTS

| 2008/0171565 | A1* | 7/2008 | Shan ................. H04W 16/14 455/501 |
| 2008/0219194 | A1* | 9/2008 | Kim .................. H04B 7/0452 370/310 |
| 2009/0047971 | A1* | 2/2009 | Fu ............................. 455/450 |
| 2010/0039948 | A1* | 2/2010 | Agrawal et al. ............. 370/252 |
| 2011/0142013 | A1* | 6/2011 | Manssour et al. ........... 370/336 |

FOREIGN PATENT DOCUMENTS

| EP | 2194741 A1 * | 6/2010 | .......... H04W 72/082 |
| WO | 2009034089 A1 | 3/2009 | |
| WO | 2009099811 A1 | 8/2009 | |

(Continued)

OTHER PUBLICATIONS

Official communication issued in the corresponding International application No. PCT/IB2010/002687, mailed Jun. 21, 2011.

(Continued)

*Primary Examiner* — Edan Orgad
*Assistant Examiner* — Saumit Shah
(74) *Attorney, Agent, or Firm* — Squire Patton Boggs (US) LLP

(57) ABSTRACT

A method for interference-aware scheduling is provided. The method can include acquiring a plurality of interference characteristics, each of the interference characteristics associated with a range of communication resources. The method may further include combining at least two of the interference characteristics into a combined interference characteristic, and transmitting a message encoding the combined interference characteristic.

24 Claims, 3 Drawing Sheets

(56) References Cited

FOREIGN PATENT DOCUMENTS

WO 2010019083 A1 2/2010

OTHER PUBLICATIONS

Frank, P. et al.; "Cooperative interference-aware joint scheduling for the 3GPP LTE uplink", IEEE 21st Int. sump. on Personal Indoor and Mobile Radio communications (PIMRC'2010), Istanbul, Turkey, Sep. 26-30, 2010, pp. 2216-2221.
Wei, H.-Y. et al., "Interfrence-aware IEEE 802.16 WiMax mesh networks", IEEE 61st Vehicular Technology Conference (VTC 2005—Spring), Stockholm, Sweden, May 30-Jun. 1, 2005, pp. 3102-3106.
Search Report issued in corresponding European Application No. 10858575.3 dated Sep. 16, 2016.

\* cited by examiner

INTERFERENCE-AWARE SCHEDULING WITH BROADCAST/MULTICAST SIGNALING

BACKGROUND

Field

Embodiments of the invention are directed to wireless or radio communications, and, more specifically, to interference-aware scheduling with broadcast/multicast signaling.

Description of the Related Art

In order to achieve high bandwidth or spectral efficiency in wireless communications systems, interference associated with transmissions between nodes in the system needs to be controlled and reduced. In systems where numerous transmitting and receiving nodes are randomly placed, coordination between the nodes may be required to avoid significant occurrence of interference. Therefore, a mechanism is needed to coordinate and optimally allocate available resources at each transmitting node in a manner that avoids interference.

One option for achieving optimal resource allocation is to have all active nodes measure channel gains to all other nodes, and provide that information to a resource manager. The resource manager can then determine the allocations for transmitter-receiver pairs and distribute those determinations to the transmitting nodes. A drawback of this centralized approach, however, is that it will likely result in a significant increase of overhead in the system.

In other distributed resource allocation schemes, each transmitting node may determine its allocation autonomously. For example, in an interference-aware radio system, nodes utilize interference-aware scheduling (IAS). IAS refers to a scheduling scheme where a transmitting radio node is aware of the interference caused by its transmission to another radio node. As a result, with IAS, the decision to transmit, and at what power level, may be based on the transmitting node's gains as well as the losses experienced at other nodes because of interference.

SUMMARY

One embodiment is directed to a method. The method includes acquiring a plurality of interference characteristics, each of the interference characteristics associated with a range of communication resources. The method further includes combining at least two of the interference characteristics into a combined interference characteristic, and transmitting a message encoding the combined interference characteristic.

Another embodiment is directed to an apparatus. The apparatus includes at least one processor, and at least one memory including computer program code. The at least one memory and the computer program code are configured, with the at least one processor, to cause the apparatus at least to acquire a plurality of interference characteristics, each of the interference characteristics associated with a range of communication resources. The at least one memory and the computer program code are further configured, with the at least one processor, to cause the apparatus at least to combine at least two of the interference characteristics into a combined interference characteristic, and transmit a message encoding the combined interference characteristic.

Another embodiment is directed to computer program embodied on a computer readable storage medium. The computer program is configured to control a processor to perform operations including acquiring a plurality of interference characteristics, each of the interference characteristics associated with a range of communication resources. The operations further include combining at least two of the interference characteristics into a combined interference characteristic, and transmitting a message encoding the combined interference characteristic.

BRIEF DESCRIPTION OF THE DRAWINGS

For proper understanding of the invention, reference should be made to the accompanying drawings, wherein.

DETAILED DESCRIPTION

Embodiments of the invention can be applied to future radio access, and can provide optimized local-area coverage to offload capacity from a cellular system in selected hotspot areas. More specifically, embodiments of the invention relate to interference-aware scheduling (IAS) where communication nodes select their transmit power in a manner that balances their own throughput gained from using more power against other nodes' throughput losses from additional interference.

Figure 1:
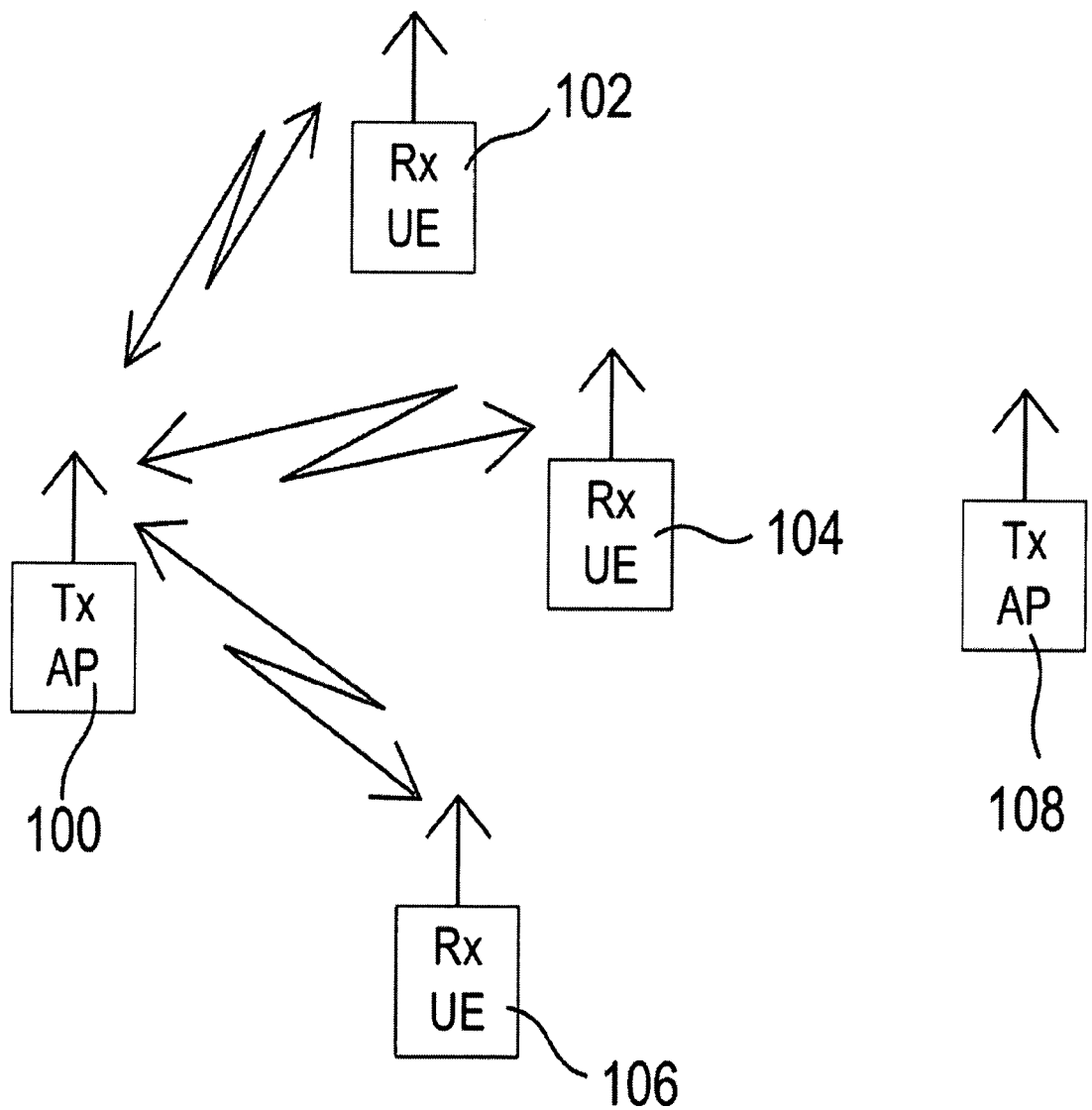
FIG. 1 illustrates a system according to one embodiment of the invention.

In IAS, every node should ideally report its interference situation. However, the resulting signaling would utilize a significant amount of radio resources. Further, reception of reports from another cell or radio network is a difficult task for a receiver. For example, the receiver may need to interrupt transmissions at the node it receives from, or it may need to re-synchronize orthogonal frequency-division multiplexing (OFDM) symbol timing to the reporting node. Accordingly, embodiments of the invention provide an interference-aware scheduling method that reduces the amount of signaling, for example, between different cells and networks.

Where resource granularity is relatively course (e.g., 5 MHz subbands in a 70 MHz system bandwidth), in downlink, one resource may be used by an access point to transmit to several mobile devices. FIG. 1 illustrates a system, according to one embodiment, including an access point 100 that serves several user equipment 102, 104, and 106. Although only three user equipment are illustrated in the example of FIG. 1, any number of user equipment may be included in the system according to other embodiments. In one embodiment, a radio resource is used for shared downlink transmission by access point 100 to user equipment 102, 104, and 106.

Each user equipment 102, 104, and 106 could transmit an individual interference report, but this would increase the amount of radio resources required for the signaling of the reports. For instance, a neighboring node 108, such as another access point, might receive simultaneous interference reports from user equipment 102, 104 and 106. In order to decode and process the interference reports separately, the interference reports need to be transmitted on independent (orthogonal) radio resources, such as different sets of subcarriers or different time slots. This increases the amount of radio resources required for signaling and decreases the efficiency of the radio system.

Therefore, embodiments of the invention provide an improved method where each user equipment 102, 104, and 106 broadcast and/or multicast a common interference report, that is coordinated by access point 100. In one embodiment, the transmissions of the common interference report are bitwise identical, and appear to node 108 as multipath replicas of a single transmission.

Figure 2:
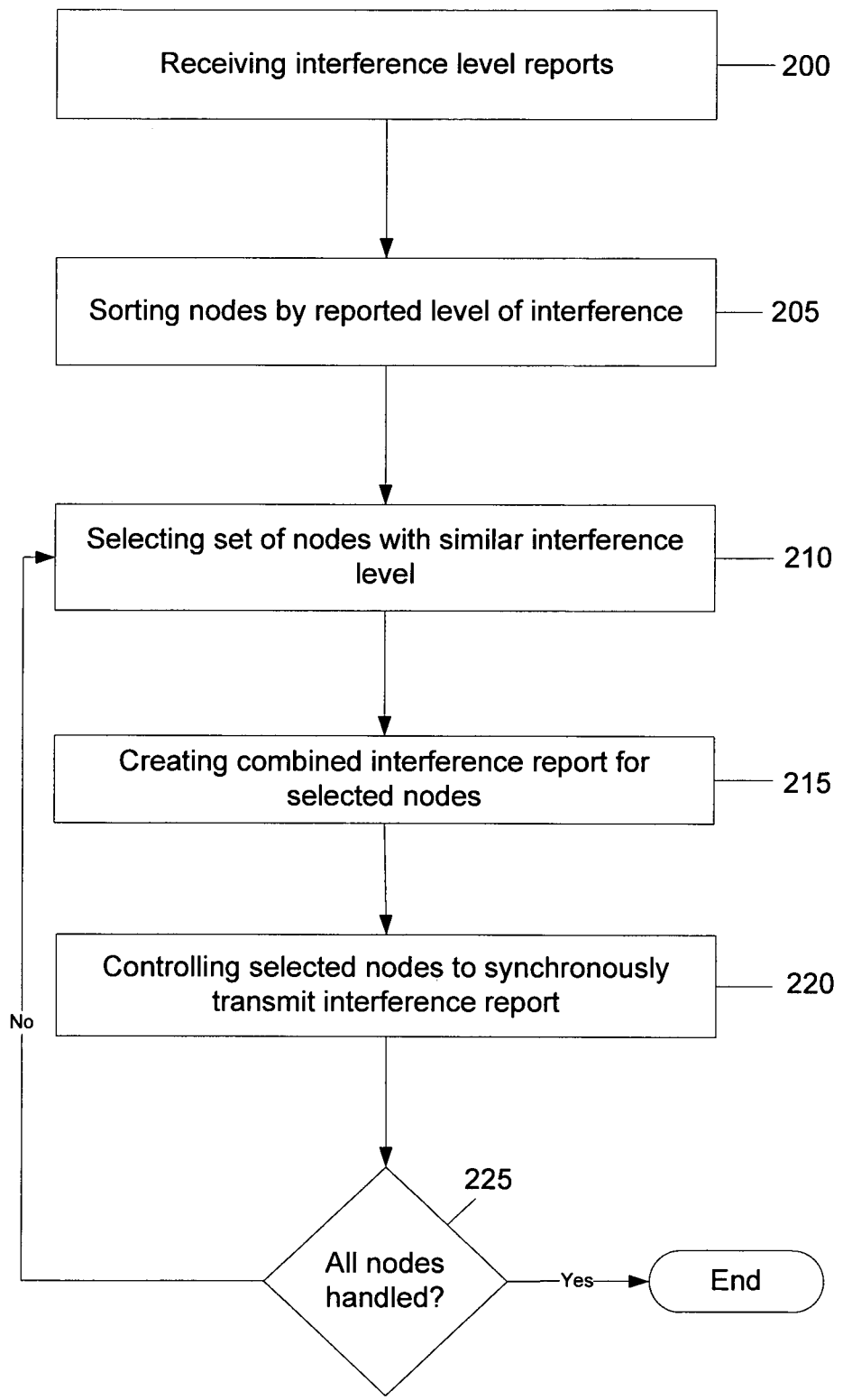
FIG. 2 illustrates a flow diagram of a method according to one embodiment.

FIG. 2 illustrates a flow chart of a method for interference-aware scheduling, in accordance with one embodiment of the invention. As shown in FIG. 2, access point 100 determines interference levels at all the served user equipment 102, 104, and 106, by receiving interference level reports from each of the user equipment at 200. In one embodiment, the interference level reports may include channel quality reports. At 205, access point 100 may sort all the served user equipment by their reported interference level in units of dBm, for example, to produce a sorted list. It should be noted that other embodiments of the invention can be carried out without performing the sorting of the reported interference levels.

Continuing with FIG. 2, at 210, access point 100 selects a set of user equipment that have reported similar levels of interference. For example, in one embodiment, levels of interference are considered similar as long as they fall within a +/−4 dB window. The selected set of user equipment includes at least one device. It is noted that when the sorting step is performed first, nodes with similar levels of interference will be adjacent in the list.

At 215, access point 100 generates a combined interference report for the selected set of user equipment, using an average interference level. Then, at 220, access point 100 controls the selected set of user equipment to synchronously transmit the combined interference report. At 225, it is determined whether all nodes have been handled. If there are nodes remaining that have not yet transmitted an interference report, then the process returns to 210 by selecting another set of user equipment with a similar interference level. If no set of nodes is found that has reported similar levels of interference, a single node may be controlled to transmit an individual interference report. Once each node has been controlled to transmit an interference report, the method ends. In one embodiment, a subset of nodes is selected from the selected set of user equipment to transmit the combined interference report.

According to an embodiment, access point 100 acquires interference characteristics on radio resources where access point 100 receives data from served user equipment 102, 104, and 106. Access point 100 may determine interference characteristics, for example, by measuring levels of interference. Access point 100 may combine at least two acquired interference characteristics into a combined interference characteristic. Access point 100 may further transmit a combined interference report on at least one a radio resource that is associated with data reception from user equipment 102, 104, and 106.

According to certain embodiments, the method described above may be stored as instructions on a computer readable storage medium and executed by a processor. The computer-readable medium may be a non-transitory medium that may be encoded with information that, when executed in hardware, performs a process corresponding to the processes disclosed in FIG. 2, or any other process discussed herein. Examples of non-transitory media comprise a computer-readable medium, a computer distribution medium, a computer-readable storage medium, and a computer program product.

Figure 3:
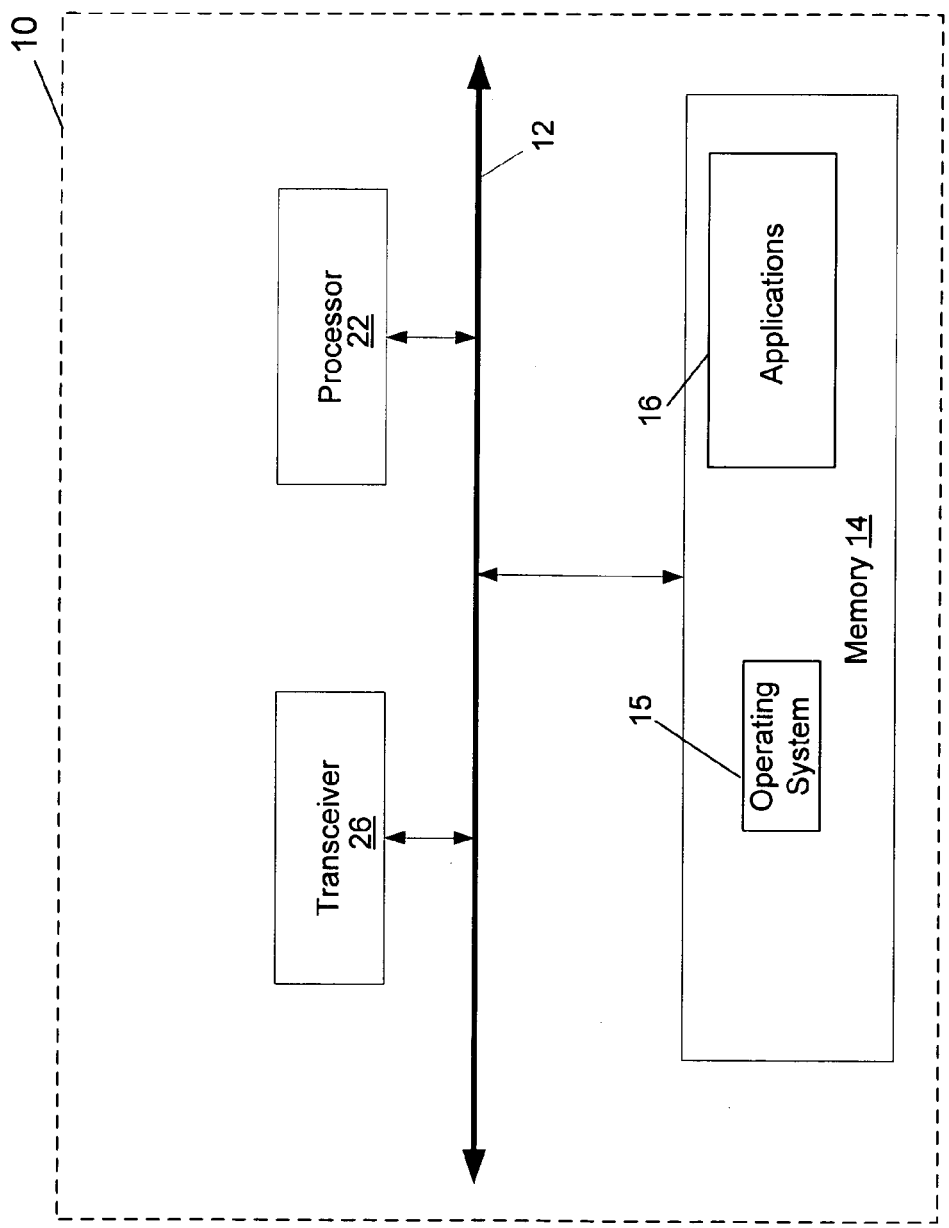
FIG. 3 illustrates a block diagram of an apparatus according to an embodiment.

FIG. 3 illustrates a block diagram of an apparatus 10 according to certain embodiments of the present invention. In some embodiments, apparatus 10 can be variously embodied as an access point, such as access point 100 illustrated in FIG. 1. The access point may be a wireless access point or any device capable of allowing devices to connect to a wireless network, or other network device capable of facilitating communication over the network. Apparatus 10 can be configured, for example, to perform the process illustrated in FIG. 2 or any other process described herein. It is noted that only the components or modules necessary for the understanding of the invention are illustrated in FIG. 3. However, it should be understood that apparatus 10 may include additional elements not illustrated in FIG. 3.

As illustrated in FIG. 3, apparatus 10 may include an interface 12, such as a bus or other communications mechanism, for communicating information between components of apparatus 10. Alternatively, the components of apparatus 10 may communicate directly with each other, without use of interface 12.

Apparatus 10 also includes a processor 22, coupled to interface 12, for receiving, managing, and/or processing information, and for executing instructions or operations. Processor 22 may be any type of general or specific purpose processor, such as a central processing unit (CPU), one or more controllers, or an application specific integrated circuit (ASIC).

Apparatus 10 may further include a transceiver 26 for transmitting and receiving data to and from the network, or transmitting and receiving information to and from other devices on the communications network. Apparatus 10 further includes memory 14 for storing information and instructions to be executed by processor 22. Memory 14 may be comprised of any combination of random access memory (RAM), read only memory (ROM), static storage such as a magnetic or optical disk, or any other type of machine or computer readable media. Computer readable media may be any available media that may be accessed by processor 22 and could comprise volatile or nonvolatile media, removable or non-removable media, and communication media. Communication media may comprise computer program code or instructions, data structures, program modules or other data, and comprises any information delivery media.

It should be noted that, although only one processor and one memory are illustrated in FIG. 3, more than one processor or memory may be included according to certain embodiments of the invention.

In one embodiment, memory 14 stores software modules or applications that provide functionality when executed by processor 22. The modules may comprise an operating system 15 that provides operating system functionality for apparatus 10. The memory 14 may also store applications 16.

According to certain embodiments, processor 22, along with memory 14 that stores computer program code, are configured to control apparatus 10 to acquiring a plurality of interference characteristics from other communications nodes, such as user equipment. In one embodiment, apparatus 10 is controlled to acquire the interference characteristics by requesting an interference level report from at least one communications node via control link, and receiving the interference level report from the at least one communications node on the control link. The at least one communications node may include all the user equipment served by apparatus 10. Each of the interference characteristics are associated with a range of communication resources. Apparatus 10 can then determine the interference characteristic associated with a communications resource by, for example, measuring a wanted signal strength, an interfering signal strength, and/or a noise level, on multiple communications resources.

The interference characteristics, according to one embodiment, include a wanted signal strength, an unwanted signal strength, and/or a reported weighing factor indicating an importance of the communications resource to the at least one communications node.

The memory 14 including the computer program code are also configured, with the processor 22, to cause the apparatus 10 to combine at least two of the interference characteristics into a combined interference characteristic, and to instruct the other communications nodes to transmit a message encoding the combined interference characteristic. In one example, the other communications nodes includes all of the user equipment served by apparatus 10. According to certain embodiments, the other communications nodes are instructed to transmit the message at a predetermined time instant that is based, for example, on a propagation delay estimate.

In one embodiment, the interference characteristics are combined by determining an average of the interference characteristics reported by each of the communications nodes. Similar interference characteristics are combined into the combined interference characteristic.

Further, according to certain embodiments, the interference characteristics from interfered communications nodes are combined based on a path loss estimate between the interfered communications nodes. In some embodiments, the combined interference characteristic includes a weighing factor indicating the number of interference characteristics that were combined. The weighing factor may be determined based on a prediction of an amount of communications nodes influenced by a single, particular interferer. The prediction of the amount of communications nodes influenced by the single interferer can be based on a path loss estimate between interfered nodes. In other embodiments, the prediction is based on a known antenna pattern.

Embodiments of the invention result in reduced overhead for interference reporting, when a radio resource is shared for several links. Compared to conventional IAS where a user equipment would transmit the interference report autonomously, some back-and-forth signaling between access point 100 and served mobile device 102, 104, and 106 is needed (e.g., reporting interference and instructing UEs to broadcast common report). However, this can be done using an existing control link which may be more efficient and faster than the envisioned IAS reporting interval (for example, tens to hundreds of milliseconds or even slower). The reduction in signaling overhead is very advantageous, since IAS information exchange crosses cell, subnetwork, or network borders and is, therefore, relatively expensive.

The computer readable medium mentioned above may be at least partially embodied by a transmission line, a compact disk, digital-video disk, a magnetic tape, a Bernoulli drive, a magnetic disk, holographic disk or tape, flash memory, magnetoresistive memory, integrated circuits, or any other digital processing apparatus memory device.

It should be noted that many of the functional features described in this specification have been presented as modules, applications or the like, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code or algorithm could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Therefore, one having ordinary skill in the, art will readily understand that the invention as discussed above may be practiced with steps in a different order, may be practiced with hardware elements in configurations which are different than those which are disclosed, and that embodiments may be combined in any appropriate manner. Accordingly, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   acquiring, by an access point, a plurality of interference characteristics for a plurality of communications nodes, each of the plurality of interference characteristics associated with a range of communication resources;
   selecting a set of the communications nodes with similar interference characteristics;
   combining, by the access point, at least two of the plurality of interference characteristics for the communications nodes having the similar interference characteristics to produce a combined interference characteristic; and
   controlling the selected set of communications nodes to synchronously transmit a message encoding the combined interference characteristic,
   wherein each transmission of the communications nodes among the selected set of communications nodes is bit-wise identical.

2. The method according to claim 1, wherein the acquiring comprises at least one of:

requesting an interference level report from at least one of the communications nodes;

receiving the interference level report from the at least one of the communications nodes; and determining an interference characteristic associated with a communications resource.

3. The method according to claim 2, wherein the determining comprises:

measuring at least one of a wanted signal strength, an interfering signal strength, and a noise level, on multiple resources and combining a result of the measuring into one report covering the multiple resources.

4. The method according to claim 1, wherein the combining comprises at least one of:

determining an average of the plurality interference characteristics;

combining interference characteristics from interfered communications nodes based on a path loss estimate between the interfered communications nodes.

5. The method according to claim 1, wherein the combined interference characteristic comprises a weighing factor indicating a number of interference characteristics that were combined.

6. The method according to claim 5, wherein the weighing factor is determined based on a prediction of an amount of communications nodes influenced by a single interferer.

7. The method according to claim 6, wherein the prediction is based on at least one of:

a path loss estimate between interfered nodes, and a known antenna pattern.

8. The method according to claim 1, wherein each interference characteristic of the plurality of interference characteristics comprises at least one of a wanted signal strength, an unwanted signal strength, and a reported weighing factor indicating an importance of the communications resource to the at least one communications node.

9. The method according to claim 1, wherein the transmitting comprises instructing at least one communications node to transmit the message at a predetermined time instant.

10. The method according to claim 9, wherein the predetermined time instant is based on a propagation delay estimate.

11. An apparatus, comprising:

at least one processor; and at least one memory including computer program code, wherein the at least one memory and the computer program code are configured, with the at least one processor, to cause the apparatus at least to acquire a plurality of interference characteristics for a plurality of communications nodes, each of the plurality of interference characteristics associated with a range of communication resources;

select a set of the communications nodes with similar interference characteristics;

combine at least two of the plurality of interference characteristics for the communications nodes with the similar interference characteristics to produce a combined interference characteristic; and control the selected set of communications nodes to synchronously transmit a message encoding the combined interference characteristic, wherein each transmission of the communications nodes among the selected set of communications nodes is bit-wise identical, and wherein the apparatus comprises an access point.

12. The apparatus according to claim 11, wherein the at least one memory and the computer program code are further configured, with the at least one processor, to cause the apparatus at least to:

request an interference level report from at least one of the communications nodes; and receive the interference level report from the at least one of the communications nodes.

13. The apparatus according to claim 11, wherein the at least one memory and the computer program code are further configured, with the at least one processor, to cause the apparatus at least to:

determine the interference characteristic associated with a communications resource.

14. The apparatus according to claim 11, wherein the at least one memory and the computer program code are further configured, with the at least one processor, to cause the apparatus at least to:

measure at least one of a wanted signal strength, an interfering signal strength, and a noise level, on multiple resources.

15. The apparatus according to claim 11, wherein the at least one memory and the computer program code are further configured, with the at least one processor, to cause the apparatus at least to:

combine a result of the measuring into one report covering the multiple resources.

16. The apparatus according to claim 11, wherein the at least one memory and the computer program code are further configured, with the at least one processor, to cause the apparatus at least to:

determine an average of the plurality of interference characteristics.

17. The apparatus according to claim 11, wherein the at least one memory and the computer program code are further configured, with the at least one processor, to cause the apparatus at least to:

combine interference characteristics from interfered communications nodes based on a path loss estimate between the interfered communications nodes.

18. The apparatus according to claim 11, wherein the at least one memory and the computer program code are further configured, with the at least one processor, to cause the apparatus at least to:

combine similar interference characteristics into the combined interference characteristic, wherein the combined interference characteristic comprises a weighing factor indicating a number of interference characteristics that were combined.

19. The apparatus according to claim 18, wherein the weighing factor is determined based on a prediction of an amount of communications nodes influenced by a single interferer.

20. The apparatus according to claim 19, wherein the prediction is based on at least one of:

a path loss estimate between interfered nodes, and a known antenna pattern.

21. The apparatus according to claim 11, wherein each interference characteristic of the plurality of interference characteristics comprise at least one of a wanted signal strength, an unwanted signal strength, and a reported weighing factor indicating an importance of the communications resource to the at least one communications node.

22. The apparatus according to claim 11, wherein the at least one memory and the computer program code are further configured, with the at least one processor, to cause the apparatus at least to:

instruct at least one communications node to transmit the message at a predetermined time instant.

23. The apparatus according to claim 22, wherein the predetermined time instant is based on a propagation delay estimate between the apparatus and the at least one communications node.

24. A computer program, embodied on a non-transitory computer readable storage medium, the computer program, when executed by a processor of an access point, is configured to control the processor to perform operations, comprising:
- acquiring a plurality of interference characteristics for a plurality of communications nodes, each of the plurality of interference characteristics associated with a range of communication resources;
- selecting a set of the communications nodes with similar interference characteristics;
- combining at least two of the plurality of interference characteristics for the communications nodes having the similar interference characteristics to produce a combined interference characteristic; and
- controlling the selected set of communications nodes to synchronously transmit a message encoding the combined interference characteristic,
- wherein each transmission of the communications nodes among the selected set of communications nodes is bit-wise identical.

* * * * *